Oct. 26, 1943.    C. H. ROTH ET AL    2,332,604
FLUID VALVE
Filed Jan. 23, 1942    2 Sheets-Sheet 1

INVENTORS
Charles H. Roth
Joseph M. Breth
BY Evans + McCoy
ATTORNEYS

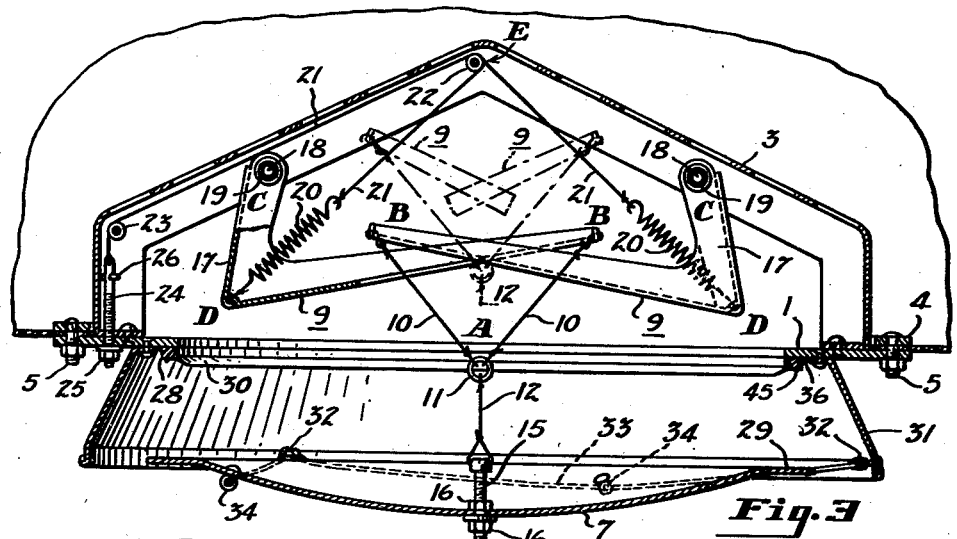
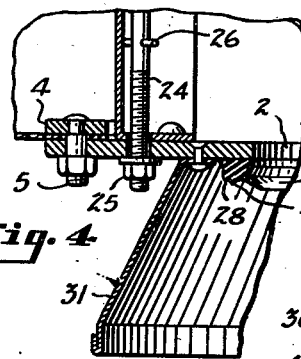
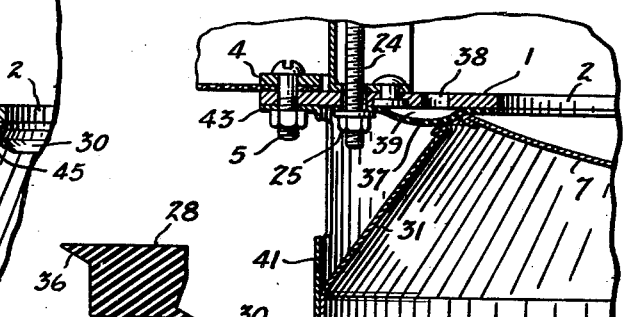
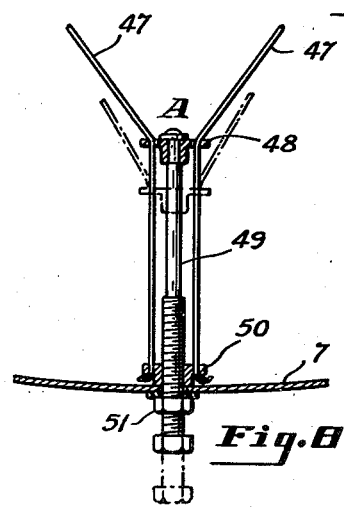
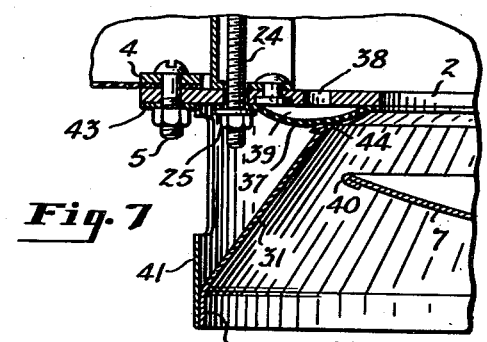

Patented Oct. 26, 1943

2,332,604

UNITED STATES PATENT OFFICE 2,332,604

FLUID VALVE

Charles H. Roth and Joseph M. Breth, Akron, Ohio, assignors to The General Tire & Rubber Company, Akron, Ohio, a corporation of Ohio Application January 23, 1942, Serial No. 427,988

11 Claims. (Cl. 137—53)

This invention relates to valves, and more particularly to automatic valves for controlling the flow of fluids at low pressures.

Fluid control valves, particularly those used for controlling the flow of gases at low pressures, such as the escape valves on balloons and other lighter than air craft, should open and close with steady and positive movements in order that the limits within which the gas pressure is maintained can be accurately regulated. Furthermore, as such valves are customarily operated by the pressure of air or gas within the craft, they must operate with a minimum of applied force. It is therefore a principal object of the invention to provide an improved automatic valve for controlling the flow of fluid, such as air or gas, in which the arrangement and cooperation of parts is such that when actuated by the pressure of gas the valve moves to its extreme or full open position and remains in such extreme open position until closing action is initiated, the closing then taking place in a steady and continuous manner until a complete seal is effected.

Another object is to provide a gas valve having a closure supported by flexible connectors in which lateral shifting of the closure during opening and closing of the valve is minimized.

Other features of the invention relate to improvements in the mechanism for supporting and actuating the valve closure member, in the means for adjusting the valve to regulate the opening and closing pressures, in a shield or guard for surrounding the valve opening to prevent air currents and the like from interfering with the operation of the valve and to control the flow of air or other gas through the valve, in a sealing gasket or strip for location between the valve body or supporting structure and the removable closure to maintain a gas-tight seal between the parts when the valve is closed, and in means for limiting the movement of the closure and for preventing rotation of the closure relative to the supporting structure. Other objects and advantages will become apparent from the following detailed description of the invention made in connection with the accompanying drawings, wherein:

Fig. 3 is a sectional view similar to Fig. 2 showing the valve in open position;

Fig. 4 is a fragmentary detail in section showing the shape of the shield or circular guard and the resilient sealing gasket;

Fig. 5 is an enlarged sectional detail showing the shape of the resilient and deformable gasket interposed between the closure and the body of the valve;

Fig. 6 is a view similar to Fig. 4 showing a modified construction of shield and resilient sealing gasket. In this figure the closure is shown in sealing position;

Fig. 7 is a sectional detail similar to Fig. 6 showing the closure in open position; and Fig. 8 is a fragmentary detail showing a modification in the form of an adjustable connector for securing the supporting or connecting elements to the center of the movable closure.

Figure 1:
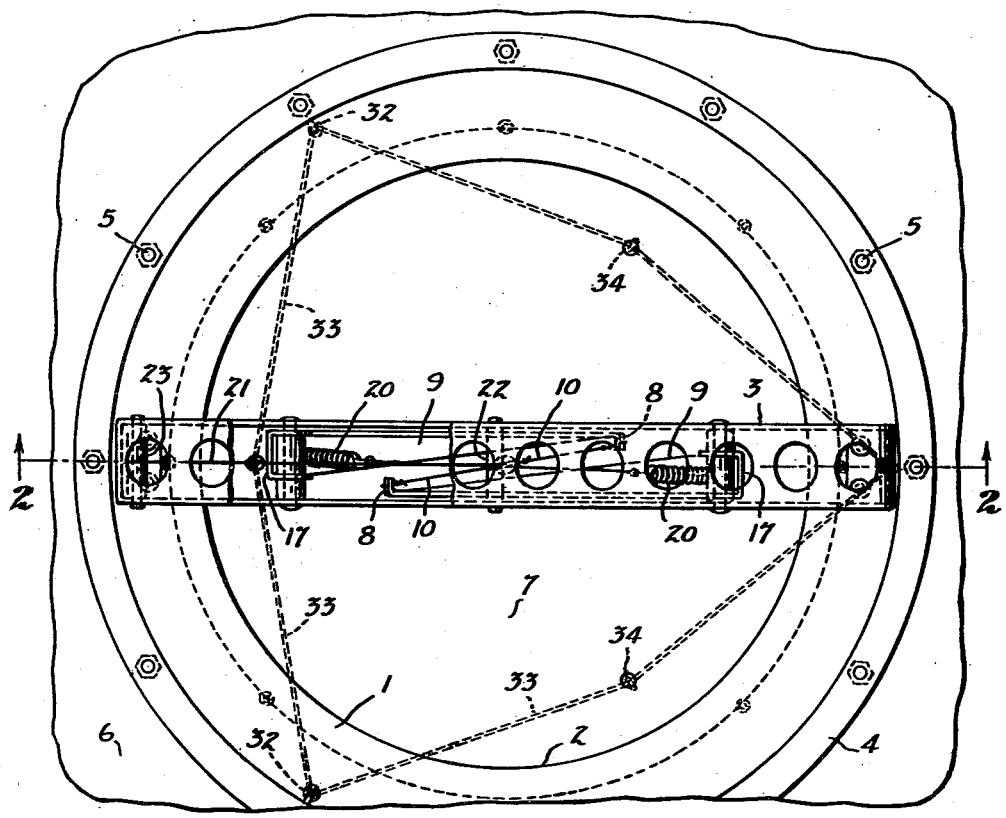
Figure 1 is a fragmentary plan view of the valve attached to the cloth or fabric envelope of a balloon or similar aircraft.

The valve of the present invention is particularly useful in controlling the escape of air or gas from balloons and therefore is customarily of relatively large size to handle the large quantities of gas which must be released to avoid bursting or other injury to the craft. For example, the valve opening may be well over a foot in diameter. Yet the valve must be relatively light since not only is it part of an airship that must be buoyant enough to support itself above the earth, but the valve is itself attached to and carried by the relatively thin envelope of the aircraft. If excessively heavy the valve would cause undesirable sagging or deformation of such envelope.

The supporting structure for the valve includes a body member or plate I which is preferably circular in shape and is formed with a central opening or aperture 2 through which the gas flows when the valve is opened. The supporting structure of the valve also includes an arched support member 3 which may be formed of light weight sheet metal perforated to reduce its weight and attached at its ends to diametrically opposite portions of the body member I, as by means of rivets. The valve is attached to envelope 6 of the aircraft by means of a clamping ring 4 and bolts 5. A circular opening is cut in the envelope 6 of slightly smaller diameter than the body ring I so that the margin of the fabric envelope around the opening overlaps the outer periphery of the body member of the valve. The clamping ring 4 is then placed against the fabric of the envelope and secured to the body member I by the bolts 5.

Disposed across the opening 2 for movement toward and away from the body member I of the supporting structure is a closure or valve cover 7. This closure is suspended from ends 8 of a pair of L-shaped arms 9 by means of flexible connecting elements such as wires or cables that are arranged in a Y formation. From the ends 8 of each of the arms or levers extends a cable connector 10 which converges toward a common junction point in the form of a ring 11, the ring in turn being connected by a flexible element such as a cable or wire 12 to a bolt 15 adjustably attached to the center of the closure 7, as by means of locking nuts 16.

The arms 9 by reason of their L-shaped construction are formed with offset portions 17 that are opposite the ends 8 to which the connectors or wire cables 10 are attached. One end of the offset portion 17 of each of the arms is mounted on a pivot pin 18, suitable anti-friction means such as needle bearings 19 being used. The pivot pins are secured in generally parallel relation to one another to spaced portions of the arched support member 3 and the arms 9 are directed toward one another in crossed relation, the crossing of the arms being substantially aligned with the cable or wire 12 carrying the closure 7.

At the other end of the offset portion 17 of each of the pivoted arms or levers 9 and spaced from the pivot 18 the arm is connected to a resilient means such as a helical tension spring 20 which normally acts on the arm 9 to turn the same on the pivot 18 and thereby draw the arm upwardly as viewed in the figures, thus tensioning each of the connectors 10 and 12 to move the closure 7 to sealing position. The springs 20 are connected to flexible cables or wires 21 trained around common guide 22 at the apex or top of the support member 3. From the guide 22 the wires 21 extend along support 3 to the side of the latter where they pass about a guide 23 and are connected to a common adjusting screw 24 that extends through and has a loose fit in an opening in the body member or plate 1 and is adjusted by means of a nut 25. By turning the adjusting nut 25 the forces in the springs 20 can be varied, thereby adjusting the valve for opening and closing at different pressures. A pin 26 extending through the screw 27 and having a press fit therein engages the structure 3 to limit turning of the screw.

Figure 2:
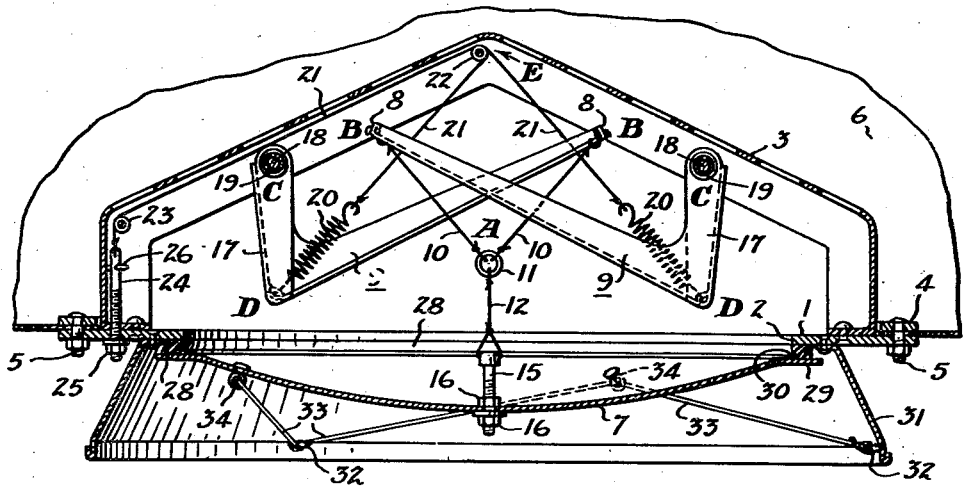
Fig. 2 is a sectional view of the valve taken substantially on the line 2—2 of Fig. 1, showing the valve in closed position.

As an important feature of this invention the arms or levers 9 are so arranged with respect to the flexible connecting cables or wires 10 and 21 that maximum torque of the arms 9 and the springs 20 about the pivots 18 occurs when the closure 7 is in sealing position, shown in Fig. 2, while minimum torque of the connectors 10 and the arms 9 about the pivots 18 occurs when the closure is in open position. Thus the valve is stabilized in closed position. However, when an increase in pressure within the balloon or other article to which the valve is attached causes a greater force to be exerted against the inner or concave side of the closure 7 sufficient to overcome the forces in the springs 20, the arms 9 are swung downwardly from the broken line positions shown in Fig. 3 toward the full line positions shown in that figure. As soon as this opening movement of the valve is initiated, the turning of the arms 9 moves the lines along which the forces in the springs 20 are acting toward the pivotal axis or pins 18 of the arms, thereby decreasing the moment arms of the forces in the springs 20 about the pivots, which results in decreased torques caused by the springs about the pivots 18. This result is obtained since the decreases in the lengths of the moment arms of the forces are more than sufficient to compensate for the increased forces in the springs caused by elongation of the latter. On the other hand, the opening movement of the closure 7 swings the connecting cables 10 so that they move away from the pivots 18, thereby increasing the moment arms of the forces in the connectors 10 about the pivots. In this manner the torque about the pivots 18 resulting from the forces in the wires or cables 10 is increased during the opening of the valve. The increase in the torque about each of the pivots 18 resulting from the force in each of the wires 10 over the torque resulting from the force in each of the springs 20 incident to the initial opening of the valve results in a complete opening of the valve to approximately the position shown by the full lines of Fig. 3. Thus each time the pressure of gas in the balloon becomes sufficient to unseat the closure 7, the closure moves to its full open position, insuring that the excessive gas pressure in the balloon is quickly relieved by the release of gas.

The several points at which the various connecting wires or cables are attached to the arms or levers 9 have been indicated by letters of reference and an inspection of the angular relationship of the parts indicates the novel arrangement by which the valve of the present invention operates in the desired manner. The lines A—B are the lines of force in the wires or connectors 10, while C represents the pivots about which the forces A—B act. In closed position of the valve the angles ABC are acute so that when the opening movement of the closure 7 is initiated, these angles are increased, thereby increasing the moment arms of the forces A—B about the pivots C. Therefore, one phase of the present invention is providing connectors between the lever arms 9 and the closure 7 so arranged that during the opening of the valve their moment arms about the pivots are increased.

The forces in the springs 20 act along the lines D—E and the turning of the arms 9 move the lines D—E towards the pivot C, the angles CDE becoming more acute as the opening of the valve proceeds. Therefore, another phase of the invention involves the arrangement of the parts such that the movement of the closure 7 to open position causes a progressive decrease in the moment arms of the force lines D—E about the pivot axes C.

A circular or annular sealing gasket 28 is disposed between the body member or plate 1 and a flattened peripheral portion 29 of the closure 7. This gasket is made of resilient deformable material, such as relatively soft rubber, and includes a relatively heavy sectioned body portion of generally rectangular shape in cross section which is adhesively secured to the plate 1 adjacent the edge of the opening 2. The sealing gasket is provided with a substantially flat working face 35 directed toward the periphery 29 of the closure 7. An integral flange 36 is formed along one side of the body of the gasket in the plane of the base thereof. This flange may be disposed in sealing relation against or under the metal attaching flange of the shield 31. Along the radially inner edge of the working face 35 of the gasket is an integral relatively thin and flexible sealing lip or flange 39. This lip extends outwardly from the working face 35 at an oblique angle and is of generally tapered form to provide a feathered edge which initially engages the marginal portion or face 29 of the closure as the latter moves to sealing position. An integral ridge or crest 45 extends outwardly from the working face 35 to engage the closure 7 and prevent sticking or adhesion between the parts which would interfere with proper operation of the valve. The ridge 45 is preferably substantially continuous about the entire circumference of the gasket and is spaced from both edges of the working face. When the closure 7 is in sealing position shown in Fig. 2, the lip 39 is disposed flatwise against the periphery 29 of the closure. While the width of the flange 30 is not critical, it is preferably of approximately the same width as the working face 35.

About the opening 2 through the body plate 1 of the valve is disposed a substantially circular shield or guard 31 that is in the form of a shell or sleeve of relatively thin sheet metal, being substantially frusto-conical in shape. This shield forms part of the supporting structure of the valve and the small diameter end of the shield is disposed against the body plate 1 radially beyond the sealing gasket 28. The shield is secured in place by suitable means such as rivets. The tapered shape of the shield 31 provides for a circular opening between the periphery of the closure 7 and the inside of the shield that progressively increases in area as the valve moves to open position. In this manner there is provided for a progressive increase in the available area for the exit of air or gas through the valve during the opening thereof and a progressive decrease in the available area for the passage of air or gas during the closing of the valve.

At a plurality of points around the shield 31 are secured fastening rings or eyes 32 to which are attached flexible guide wires or stays 33. The wires or stays 33 extend angularly with respect to one another from the rings or eyes 32 and are connected at spaced points to rings or eyes 34 adjacent the periphery of the closure 7. Each of the rings 34 has a plurality of wires from different rings on the supporting structure connected thereto, the angularity of the wires with respect to one another preventing objectionable turning of the closure 7. The guide wires or stays 33 are adjusted in length so that when the closure 7 is in closed position, the slack is taken up. Also, the position of the holding or fastening rings 32 is arranged so that the wires 33 limit the opening movement of the closure 7 to retain the periphery 29 within the confines of the shield 31. Thus the shield prevents excessive lateral displacement of the closure 7 and also diverts wind currents from blowing under the closure 7 when the latter is in open position.

Figs. 5 and 6 illustrate a modification of the invention in which a seal is provided between the closure 7 and the body plate 1 of the supporting structure by means of a relatively thin circular strip 37 made of resilient deformable material, such as rubber. The edges of the rubber strip are adhesively secured to continuous spaced portions of the outside of the plate 1 extending circumferentially around the opening 2, and a plurality of openings 38 through the plate 1 allow gas under pressure from the inside of the balloon or other article to which the valve is attached to inflate and distend the elastic rubber strip 37 as shown in Fig. 5. The rubber strip 37 with the plate 1 to which the rubber is secured along spaced parallel circumferentially extending lines of connection then constitute enclosing means for a chamber 39 that remains filled with the gas from the inflated article or balloon. In this modification of the invention the closure 7 may be formed with a rolled edge 40 curved toward the body member 1 to engage the sealing strip 37 when the valve is closed. The maintenance of a gas pressure in the circular chamber 39 insures a tight seal between the closure 7 and the supporting structure of the valve without an excessive mechanical pressure of the closure against the valve body.

In the modification of Figs. 5 and 6 the frusto-conical circular shield 31 is attached to the body plate 1 of the valve by means of a cylindrical supporting shell 41, the latter being secured by welding as at 42 to the large diameter end of the shield 31, and to the body plate 1 as by means of the bolts 5 which pass through a flange 43 formed on the shell 41. The small diameter or inner end of the shell 31 is formed with a rolled edge 44 which circumferentially contacts the inflated sealing strip 37.

As a means for altering the angularity of the flexible connectors 10 with respect to the lever arms 9, the present invention provides the modified connecting bolt structure shown in Fig. 8 which may be used in place of the bolt 15 previously described. In this modification the flexible connectors 10 are replaced by cables or wires 47 which extend through holes in a guide collar 48 rotatably mounted on the reduced diameter end of an adjusting bolt 49. The wires 47 are secured to a collar 50 threaded on the bolt 49 and disposed against the inside of the closure 7. The bolt 49 extends through the closure 7 and a locking nut 51 is provided to cooperate with the threaded collar 50 to secure the bolt 49 in adjusted position. By screwing the bolt 49 through the collar 50 the rotatable collar 48 can be moved to different spaced positions relative to the closure 7 as indicated by the broken and full lines of Fig. 8. This arrangement permits the common junction point (indicated at A) of the wires leading to the ends 8 of the arms 9 to be raised or lowered as desired, thereby altering the angularity of the wires with respect to the arms 9 and changing the moment arms of the forces in the wires 47 with respect to the pivotal axes C of the arms 9.

Manipulation of the adjusting bolts 24 and 15 or the adjusting bolt 49, if the latter is used, alters the opening and closing pressures of the valve so that within reasonable low pressure limits any desired pressures can be maintained in the balloon or other craft to which the valve is attached. Suitable calibration of the adjusting bolts can, of course, be made in accordance with conventional practice, and it is to be observed that when such calibration has been made, the valves can be adjusted while they are in place on the aircraft and without deflating the craft or losing any gas therefrom. Furthermore, it is obvious that for altering the pressure limits of the valves beyond the regulation provided by the adjusting bolts, the springs 20 can be altered in strength or other characteristics and may be of such strength that the torques produced thereby about the pivots 18 actually increase during the opening of the valve. In such cases, the torques produced by the forces in the wires 10 would necessarily be sufficient to overcome the spring torques in the opening of the valve.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:

1. An automatic fluid control valve comprising a supporting structure including an apertured member, a closure movable to a sealing position across the aperture in said member, a pair of arms pivoted on the structure and directed toward one another, means separately connected to each of the arms and having a common flexible connection to the closure, and means separated from said connecting means acting on the arms at points laterally of the lines between the pivot and the arm ends to retain the closure in sealing position.

2. An automatic fluid control valve comprising a supporting structure including an apertured member, a closure movable to a sealing position across the aperture in said member, a pair of arms pivoted on the structure and directed toward one another, means connected to one end of each of the arms and also through a common flexible connection to the closure for moving the arms when the closure is forced from sealing position, and means acting on the arms at points of the latter substantially in the pivotal planes of the arms but spaced laterally from the lines between the pivots of the arms and said arm ends to retain the closure in sealing position.

3. An automatic fluid control valve comprising a supporting structure including an apertured member, a closure movable to a sealing position across the aperture in said member, a pair of arms pivoted on the structure and directed toward one another in crossed relation, means connected to the arms at points beyond the crossing thereof and having a common flexible connection to the closure substantially in the line bisecting the angle between the arms at said point of said connection to said closure, and means acting on the arms to retain the closure in sealing position.

4. An automatic fluid control valve comprising a supporting structure including an apertured member, a closure movable to a sealing position across the aperture in said member, a plurality of arms pivoted on the structure, means flexibly connecting one end of each arm to a common connection centrally of the closure, and means acting on each arm at a point substantially in the pivotal plane of the arm but spaced laterally from the line between the arm pivot and said one end of the arm to retain the closure in sealing position.

5. A gas relief valve for balloons and the like comprising a supporting structure including a member having a circular aperture therein, a closure and flexible means supporting the same for movement toward and away from said member to seal and to open the aperture, a circular shield secured to said member around the aperture to control the flow of gas through the aperture, and a plurality of connecting elements extending between the shield and the closure and connected to spaced points about the outer periphery of said closure and arranged to limit the movement of the latter away from the aperture in the supporting structure and to prevent tipping of portions of said closure below said shield so as to deflect extraneous air through said aperture when the closure is in the open position.

6. A gas relief valve comprising a supporting structure including a member having a circular aperture therein, a closure and means supporting the same for movement toward and away from said member to seal and to open the aperture, a circular shield secured to said member around the aperture to control the flow of gas through the aperture, and a plurality of connecting elements extending between the shield and the closure to limit the movement of the latter away from the aperture in the supporting structure, said elements being angularly disposed relative to one another at the open limit of movement of the closure to resist turning of the closure.

7. A gas valve comprising a supporting structure including an apertured member, a closure movable toward and away from said member, a plurality of flexible elements connected to a common central portion of the closure and having connection with spaced movable members on the supporting structure, and means for actuating the movable members to draw on the flexible connectors and hold the closure in sealing position against the apertured member.

8. A gas valve for balloons and the like comprising a supporting structure including an apertured member, a closure flexibly carried by a plurality of arms pivoted on said apertured member and mounted for movement toward and away from said member, and means for restricting lateral and turning movement of the closure, said means including a plurality of pairs of flexible guys, each pair having a common point of attachment to the supporting structure and the guys of each pair being attached to spaced outer peripheral edge portions of the closure to prevent tipping of portions of said closure below said shield so as to deflect extraneous air through said aperture when said closure is in the open position.

9. A gas valve comprising a supporting structure including an apertured member, a closure mounted for movement toward and away from said member, a substantially continuous annular sealing gasket formed of wide, thin flexible material disposed about the aperture in said member, the edges only of said gasket being secured to continuous spaced portions of said member, and passages through the apertured member between said spaced portions to admit gas under pressure between the apertured member and the gasket for inflation of the latter to convex form, said closure being substantially concentric with said gasket and the periphery thereof being smaller in diameter than the diameter of the gasket at the point of maximum bulge so that the inner peripheral portion of the gasket tends to bear laterally against the outer peripheral edge portion of said closure.

10. An automatic fluid control valve comprising a supporting structure including an apertured member, a closure movable between an open position and a sealing position across the aperture in said member, a shield to control the flow of fluid passing through the opening, said shield being formed of relatively thin rigid sheet material in the form of a tapered sleeve, and a member secured to the shield at at least one point remote from the small end of the shield and extending to the supporting structure for mounting the shield thereon with the small end of the latter directed toward but spaced from the apertured member.

11. In a gas valve of the type having a supporting structure including an apertured member, a closure, and flexible connectors having a common connection to the closure and extending divergently from said connection to the supporting structure, a device for adjusting the angle of divergence of the connectors comprising an element for retaining the ends of the flexible connectors adjacent the closure, an element slidable along the connectors to hold the latter together, and means for retaining the elements in different spaced relationships.

CHARLES H. ROTH.
JOSEPH M. BRETH.